US009475916B2

(12) United States Patent
Feola et al.

(10) Patent No.: US 9,475,916 B2
(45) Date of Patent: Oct. 25, 2016

(54) PROCESS FOR CURING SURFACE-COATING COMPOSITIONS (71) Applicant: ALLNEX AUSTRIA GmbH, Werndorf (AT)

(72) Inventors: Roland Feola, Graz (AT); Thomas Schonbacher, Kalsdorf (AT); Armin Temel, Graz (AT); Edmund Urbano, Graz (AT); Oliver Ferk, Graz (AT); Georg Gubitz, Graz (AT); Enrique Herrero Acero, Graz (AT); Katrin Greimel, Graz (AT); Veronika Perz, Graz (AT); Amra Suljanovic, Graz (AT)

(73) Assignee: ALLNEX AUSTRIA GMBH, Werndorf (AT)

(*) Notice: Subject to any disclaimer, the term of this patent is extended or adjusted under 35 U.S.C. 154(b) by 32 days.

(21) Appl. No.: 14/057,307

(22) Filed: Oct. 18, 2013

(65) Prior Publication Data
US 2014/0356540 A1 Dec. 4, 2014

Related U.S. Application Data (63) Continuation of application No. 13/995,639, filed as application No. PCT/EP2011/073497 on Dec. 20, 2011, now abandoned.

(30) Foreign Application Priority Data

Dec. 20, 2010 (AT) .................................. 2099/2010

(51) Int. Cl.
C09D 167/02 (2006.01)
C08K 5/098 (2006.01)
C08K 5/3475 (2006.01)
B05D 7/24 (2006.01)
(Continued)

(52) U.S. Cl.
CPC .............. C08K 5/098 (2013.01); B05D 3/108 (2013.01); B05D 7/24 (2013.01); C08K 5/3475 (2013.01); C09D 167/02 (2013.01); C09D 167/08 (2013.01)

(58) Field of Classification Search
None
See application file for complete search history.

(56) References Cited

U.S. PATENT DOCUMENTS 6,023,000 A  2/2000 Fritz-Langhals et al.
6,149,977 A  11/2000 Fischer et al.
6,241,849 B1* 6/2001 Franks .................. D21C 5/005
162/191

(Continued)

FOREIGN PATENT DOCUMENTS

DE  44 45 088  6/1996
EP  0 885 868  12/1998

(Continued)

OTHER PUBLICATIONS

Rittstieg et al, Biotechnol. Prog., 19, pp. 1505-1509, 2003.*

(Continued)

Primary Examiner — Erma Cameron
(74) Attorney, Agent, or Firm — Wenderoth, Lind & Ponack, L.L.P.

(57) ABSTRACT

The present invention relates to a method for coating surfaces by applying an oxidatively drying coating composition comprising at least one oxidatively drying binder and at least one drying agent acting as an accelerator of the drying and curing process proceeding under the action of an oxidizing agent, characterized in that the drying agent comprises at least one oxidoreductase and at least one mediator which is converted by the at least one oxidoreductase.

44 Claims, 6 Drawing Sheets (51) Int. Cl.
*B05D 3/10* (2006.01)
*C09D 167/08* (2006.01)

(56) References Cited

U.S. PATENT DOCUMENTS

| | | |
|---|---|---|
| 6,242,245 B1 | 6/2001 | Amann et al. |
| 6,297,403 B1 | 10/2001 | Fritz-Langhals et al. |
| 6,306,991 B1 | 10/2001 | Fischer et al. |
| 2014/0094552 A1 | 4/2014 | Arumugam et al. |

FOREIGN PATENT DOCUMENTS

| | | |
|---|---|---|
| EP | 0 905 306 | 3/1999 |
| EP | 0 950 669 | 9/2004 |
| WO | 97/48786 | 12/1997 |
| WO | 98/55684 | 12/1998 |
| WO | 00/15899 | 3/2000 |
| WO | 01/46294 | 6/2001 |
| WO | 2004/067582 | 8/2004 |
| WO | WO2010/089598 * | 8/2010 |

OTHER PUBLICATIONS

Kirk-Othmer Encyclopedia of Chemical Technology, Fourth Edition, vol. 2, pp. 53-63, 1992.*
International Search Report issued Apr. 5, 2012 in International (PCT) Application No. PCT/EP2011/073497.
Kobayashi, et al., "Artificial Urushi", Chem. Eur., vol. 7, No. 22, 2001, pp. 4754-4760.

* cited by examiner

PROCESS FOR CURING SURFACE-COATING COMPOSITIONS

The invention relates to a method for curing coating agents for surfaces under the action of oxidizing agents, and coating agents suitable therefor.

BACKGROUND OF THE INVENTION

Oxidatively curing coating agents such as paints and clear coats, as a rule, contain resin systems as binders which crosslink by absorbing atmospheric oxygen. In general, this crosslinking process is very slow such that the drying and curing of such coating agents requires, or can require, a great deal of time. To accelerate this curing process siccatives, also referred to as "driers" are employed. According to DIN EN 971-1 (1996) these siccatives are most frequently metal salts of organic acids which are soluble in organic solvents and binders. The most commonly employed drying agents are salts of transition metals which occur in at least two non-zero oxidation states, in particular salts of cobalt and manganese (primary siccatives). These are also utilized in combination with further metal salts which are not siccatives themselves which, however, as secondary siccatives exhibit synergistic effects or ameliorate or compensate the most unfavorable properties of the primary siccatives. Preferred organic acids are, for example, naphthenic acid, isooctanic acid or linseed fatty acid. The mass fraction of the siccatives in oxidatively drying coating agents is conventionally between 1% and 3% referred to the mass of the resin fraction in the binder, corresponding to a mass fraction of 0.1% to 0.3% of the metals.

Patent application WO 2001/046294 describes a coating agent which comprises an alkyd resin, a siccative (preferably mangano-octoate), activated with a complexing agent such as 2,2'-bipyridyl or 1,10-phenanthroline, and a polythiol. This type of coating agent, due to the manganese siccative, leads to undesirable discolorations with the coating agent developing a brownish color. In addition, 2,2'-bipyridyl or 1,10-phenanthroline in connection with iron ions, which, for example, derive from a metallic substrate, tend toward the formation of strongly colored complexes.

Heavy metals, such as manganese or cobalt, frequently utilized in siccatives, not only entail disadvantages with respect to their color-changing properties, but they are also of concern with respect to their environmental compatibility.

BRIEF SUMMARY OF THE INVENTION

The present invention therefore addresses the problem of specifying a method of curing oxidatively drying binders using small quantities of siccatives, or entirely without the above described metal salt siccatives, under the action of oxidizing agents such as atmospheric oxygen and to provide binder compositions suitable for such methods.

The present invention therefore relates to a method for curing a coating agent for surfaces by applying an oxidatively drying coating composition onto surfaces and exposing them to the action of an oxidizing agent, in particular air, wherein the coating composition comprises at least one oxidatively drying binder and at least one drying agent acting as an accelerator of the drying and curing process proceeding under the action of an oxidizing agent, characterized in that the drying agent comprises at least one oxidoreductase and at least one mediator, which is converted by the at least one oxidoreductase. The present invention further relates to a coating composition suitable for said method, which comprises at least one oxidatively drying binder, at least one oxidoreductase and at least one mediator.

It was found according to the invention that electron transferring enzymes, such as oxidoreductases in combination with a mediator as the drying agent, in comparison to like compositions without drying agents, are capable of significantly reducing the drying and curing times of oxidatively drying binders, which are present, for example, in paints and lacquers and varnishes. One advantage of such drying agents is, inter alia, that metals, in particular heavy metals such as cobalt and manganese, copper or lead, can be omitted and these drying agents, utilized according to the invention, consequently represent environmentally friendly alternatives.

DETAILED DESCRIPTION OF THE INVENTION

By the term "oxidatively drying binders" are subsumed binders drying according to the invention such as oils, medium and long oil [length] alkyd resins, epoxide esters, butadiene polymerisates and butadiene copolymerisates, for example with styrene, polyurethanes and polyesters with unsaturated moieties. In terms of the invention especially preferred for use as "oxidatively drying binders" are alkyd resins which comprise incorporated condensates of unsaturated fatty acids and which are preferably emulsifiable in water. Examples of such suitable alkyd resins emulsifiable in water are acrylate- and urethane-modified alkyd resins as well as oxazoline-modified alkyd resins.

The at least one oxidatively drying binder is preferably an alkyd resin which can also be modified through conversion of the completed alkyd resin with agents such as olefinically unsaturated compounds, epoxide functional compounds or isocyanate functional compounds or during its synthesis, in particular through grafting of an alkyd resin, or the fatty acids utilized as starting substances for alkyd resins, with olefinically unsaturated monomers, in particular styrene, vinyl toluol and/or para-methyl styrene, maleic acid anhydride or monomers derived from acrylic acid or methacrylic acid, such as these acids themselves and their alkyl or hydroxyalkyl esters or mixtures of two or more of such olefinically unsaturated monomers, by conversion of the completed alkyd resins with hydroxy functional silicon oligomers or polymers, by reesterification or reamidation of alkyd resins with polyamidoamines at increased temperatures starting at 180° C., by conversion of, in particular, long oil hydroxy functional alkyd resins with polyfunctional isocyanates, by conversion preferably of triglycerides with epoxide resins to form a mixture of fatty acid modified epoxide resins and mono- and di-glycerides, wherein these mixtures are subsequently converted with di- or polycarboxylic acids to form epoxide alkyd resins, phenolic resin modified alkyd resins, and maleinate alkyd resins comprising as an acid component an adduct of maleic acid anhydride and resin acids such as abietinic acid, palustrinic acid, pimaric acid and isopimaric acid or mixtures thereof.

Conventional oxidatively drying alkyd resins can be obtained using a condensation reaction of a polyvalent alcohol, or several polyvalent alcohols, of one or several polycarboxylic acid(s) or the corresponding anhydrides, and long-chain unsaturated fatty acids or oils. The skeleton of these alkyd resins is a polyester comprised of building blocks derived from polyols and polycarboxylic acids. Unsaturated fatty acids or groups derived from a drying or semidrying oil, or several drying or semidrying oils, are covalently bonded with this skeleton. Glycerine is herein frequently employed as the polyol. Other, non-limiting examples of suitable polyvalent alcohols are pentaerythrite, di-pentaerythrite, ethylene glycol, diethylene glycol, propylene glycol, neopentyl glycol, trimethylol propane, trimethylol ethane, di-trimethylol propane and 1,6-hexanediol. The di- and polycarboxylic acids and corresponding anhydrides utilized for the production of the alkyd resins can be aromatic, aliphatic and cycloaliphatic components from petrochemical starting materials. Such polycarboxylic acids are, for example, phthalic acid and its isomeric isophthalic acid and terephthalic acid, trimellitic acid, pyromellitic acid, pimelic acid, adipic acid, azelaic acid, sebacinic acid, maleic acid, fumaric acid and tetrahydrophthalic acid.

The broad distribution of molar masses generated in the polycondensation leads to high viscosity of the resins. Fractions with higher molar mass have an advantageous effect on the drying rate, however, they also increase the viscosity of the binder, while fractions with lower-molecular oligomers lead to lower viscosities; however, they slow down the development of hardness.

EP 0 950 669 A2 describes a method for crosslinking so-called oxidative polymers (such as, for example, phenolic, active methylene and amino groups) by using oxidizing enzymes, such as for example laccase, polyphenol oxidase and horseradish peroxidase.

S. Kobayashi et al. (Chem. Eur. J. 7 (2001):4754) disclose the crosslinkage of urushiol analogues (catechol derivatives with unsaturated hydrocarbon chains) with the aid of laccase. The crosslinkage takes place through the oxidative coupling of the phenol groups of urushiol and the subsequent auto-oxidation of the unsaturated groups in the side chains.

Apart from alkyd resins, the composition according to the invention comprises a drying agent that comprises at least one oxidoreductase and optionally at least one mediator. In this composition the at least one oxidoreductase catalyzes the electron transfer from the at least one mediator to the molecular oxygen in the atmosphere. The oxidized mediator, in turn, oxidizes the unsaturated moieties of the alkyd resin considered to be the substrate whereby the crosslinking of the alkyd resin occurs. If oxidoreductases, such as for example oxygenases, are employed which do not require mediation, the addition of at least one mediator is not required.

In the present application the term "mediators" is understood to mean redox catalysts which are oxidized by an oxidizing agent such as the oxygen of the air with the cooperation of the employed enzyme, and, in a subsequent reaction, oxidize the substrate and are herein converted again to the reduced form. As a rule, mediators are low-molecular organic or inorganic compounds. For ecological reasons the mediators should be water-soluble, biologically readily degradable and nontoxic. They should further not form toxic byproducts or degradation products in the process. In the oxidized state the activated mediators should be radicals as long-lived as possible with the requisite redox potential for the oxidation of the substrate. The mediators are to be regenerated after the electron transfer step, thus [are to] exhibit reversible redox behavior such as is required of catalysts. Such mediators are, for example, N-hydroxy compounds, in particular also oximes.

The alkyd resin, which is especially preferably used according to the invention is selected from the group comprised of a) alkyd resins that can be produced from fatty acids, polyvalent alcohols and polybasic organic acids,
b) alkyd resins that can be produced from oils, polyvalent alcohols and polybasic organic acids,
c) urethane alkyds that can be obtained by conversion of hydroxy functional alkyd resins a) or b) with polyfunctional isocyanates,
d) alkyd resins that can be obtained by grafting an alkyd resin a) or b), or the fatty acids utilized in their production, with olefinically unsaturated monomers,
e) alkyd resins that can be obtained by conversion of an alkyd resins a) or b) with hydroxy functional silicon oligomers or polymers, wherein the alkyd resin before the conversion, through the reaction with a suitable agent, is provided for example with an isocyanate functionality or an acid anhydride functionality,
f) alkyd resins that can be obtained by transesterification or transamidation of an alkyd resin a) or b) with polyamidoamines at increased temperatures starting at 180° C.,
g) epoxide alkyd resins by conversion of a mixture of fatty acid-modified epoxide resins and mono- and di-glycerides with di- or polycarboxylic acids,
h) phenolic resin-modified alkyd resins, and
i) maleinate alkyd resins comprising an adduct of an alkyd resin and an olefinically unsaturated acid component selected from maleic acid anhydride and resin acids, preferably abietinic acid, palustrinic acid, pimaric acid and/or isopimaric acid or mixtures thereof, wherein the fatty acids or oils utilized for the synthesis preferably comprise a mass fraction of at least monounsaturated fatty acids of at least 3%.

A person of skill in the art is sufficiently familiar with alkyd resins and methods for their production.

In the composition according to the invention as the oxidoreductases can be employed oxidoreductases of class 1.1.1 to 1.97 according to the International Enzyme Nomenclature (Committee of the International Union of Biochemistry and Molecular Biology) (Enzyme Nomenclature, Academic Press, Inc., 1992, pp. 24 to 154).

The at least one oxidoreductase is especially preferably an oxidase, an oxygenase or a peroxidase.

The oxidase is preferably selected from the group comprised of polyphenol oxidases, laccases, tyrosinases, catechol oxidases and bilirubin oxidases.

The enzymes utilized according to the invention can in principle be of any origin provided they are capable of shortening the drying times of an oxidatively drying binder in the presence of a mediator in comparison to a binder without enzyme addition. The enzymes can be either directly isolated from the corresponding source (for example fungus, bacterium, plant, etc) or be produced by means of a recombinant technology.

According to a preferred embodiment of the present invention a laccase of fungal origin is employed, preferably selected from the group comprised of *Collybia, Fomus, Lentinus. Pleurotus, Aspergillus, Neurospora, Podospora, Phlebia*, in particular *P. radiata, Coriolus*, in particular *C. hirsitus, Botrytis, Polyporus*, in particular *P. pinsitus* and *P. versicolor, Rhizoctonia solani, Scytalidium*, in particular *S. thermophilium, Pyricularia*, in particular *P. oryzae, Coprinus*, in particular *C. cinereus, Trametes*, in particular *T. hirsuta, T. villosa* and *T. versicolor, Coriolopsis gallica, Phanerochaete chrysosporium, Heterobasidion annosum, Spiniger meineckellus* and *Myceliophthora thermophila*.

The laccase can also be of bacterial origin. The laccase can preferably be derived from a bacterium that is selected from the group comprised of *Bacillus, Pseudomonas, Streptomyces* and *Azospirillum*.

According to the invention the enzymes of a certain origin can also be produced recombinantly in a different host cell thereby that the enzyme encoding DANN section is isolated from the source of origin and introduced into a host cell. Appropriate methods are sufficiently familiar to the person of skill in the art.

The oxygenase is preferably selected from the group comprised of monophenol monooxygenase, such as for example P450.

According to a further preferred embodiment of the present invention the peroxidase is of plant, bacterial or fungal origin.

The peroxidase of fungal origin is preferably obtained from a fungus that is selected from the group comprised of the genus *Coprinus*, preferably *Coprinus cinerius* or *Coprinus macrorhizus*.

The peroxidase of microbial origin is preferably isolated from a *bacillus*, in particular *Bacillus pumilus*.

According to a preferred embodiment of the present invention the at least one peroxidase is selected from the group comprising horseradish peroxidase, soy bean peroxidase, pea peroxidase, guar bean peroxidase, garbanzo bean peroxidase, scarlet runner bean peroxidase, rice peroxidase, cotton leaf peroxidase and haloperoxidases.

The composition according to the invention comprises at least one of the enzymes listed herein. However, it is understood that it is feasible to combine these enzymes in any desired manner, such that the composition can comprise at least two, three, four, five, six, seven, eight, nine, ten, fifteen or twenty of these enzymes.

The enzymes according to the invention (with the exception of oxygenases) require mediators for the electron transfer. The at least one mediator provided in the composition is preferably selected from the group comprised of nitroso compounds and hydroxyamine compounds, such as cycloaliphatic NO or NOH containing compounds, heterocyclic NO or NOH containing compounds, aromatic NO or NOH containing compounds, phenolic compounds with at least one, preferably two or more, phenolic hydroxyl group or groups, phenothiazine, phenyl compounds, heterocyclic compounds, polyoxometalates, 2,4-pentanedione and derivatives of these compounds.

According to the invention mediators are molecules that serve as "electron shuttles" and can transfer electrons between the enzyme and the alkyd resin (in particular the structures in the alkyd resin derived from unsaturated compounds). The mediators are selected according to the invention from the above list. However, it is understood that any molecules can be employed as mediators which, in combination with said enzymes, act as redox catalysts. In addition, especially preferably are also employed mediators which are disclosed in the applications EP 0 905 306, WO 98/55684, EP 0 885 868 and DE 44 45 088, whereby the particular disclosure is incorporated herein by reference.

Polyoxometalates (abbreviated POMs) are inorganic metal-oxygen clusters with defined oligomeric or polymeric structure units which form spontaneously under suitable conditions (acidification) in aqueous environments and which, upon reduction, form soluble, most often strongly colored, anionic species. These polyoxometalates are built of three or more transition metal oxyanions (for example vanadate or tungstate) and are connected across bridges of oxygen atoms (see, for example, M. T. Pope, Heteropoly and Isopoly Oxometalates, Springer Verlag, Berlin, 1983). In this way they can form a large, closed three-dimensional network. The metal atoms are conventionally transition metals of groups 5 or 6 (new IUPAC system, corresponding to V A and VI A of the old IUPAC system and V b and VI b of the Chemical Abstracts System) in high oxidation numbers, which means their electron configuration is d0 or d1. Examples are vanadium, niobium, tantalum, molybdenum and tungsten, each at the highest oxidation state. The polyoxometalates can be divided into two groups: heteropolyanions and isopolyanions. Heteropolyanions are metal clusters with included heteroanions such as the sulfate or the phosphate ion. Isopolyanions are pure metal oxide networks without heteroatoms. Together with hydrogen ions, polyoxometalates can form heteropolyacids. For the sake of simplicity, the term polyoxometalate used in the description encompasses the salts of the poly acids as well as also the corresponding poly acids.

According to a preferred embodiment of the present invention the heterocyclic NOH containing compounds are selected from the group comprised of hydroxybenzotriazol and its derivatives, alloxanoxime and its derivatives, N-hydroxy-N-phenylacetamide and its derivatives, N-hydroxylated triazines and their derivatives, and N-hydroxyphthalimide and its derivatives.

The hydroxybenzotriazol derivative preferably has the formula:

wherein M represents hydrogen, alkali, preferably sodium or potassium, alkaline earths, preferably calcium or magnesium, ammonium, $C_1$ to $C_4$ alkylammonium or $C_1$ to $C_4$ alkanolammonium, and the groups $R^1$, $R^2$, $R^3$ and $R^4$ are identical or different and represent hydrogen, halogen, preferably fluorine, chlorine or bromine, hydroxy, formyl, amino, nitro, a straight-chain or branched $C_1$ to $C_{12}$ alkyl, a straight-chain or branched $C_1$ to $C_6$ alkoxy, carbonyl-$C_1$— to $C_6$-alkyl, phenyl, benzyl, phenyloxy, —COOR$^5$, —SO$_2$OR$^5$, —SO$_2$NH$_2$, —NHSO$_2$, —CONH$_2$, —PO(OR$^5$)$_2$, —P(OR$^5$)$_2$ or —OPO(OR$^5$)$_2$, wherein R$^5$ is identical or different and represents hydrogen, alkali, preferably sodium or potassium, alkaline earth metal, preferably calcium or magnesium, ammonium, $C_1$ to $C_4$ alkylammonium or $C_1$ to $C_4$ alkanolammonium, a straight-chain or branched $C_1$ to $C_{18}$ alkyl, preferably $C_2$ to $C_{15}$ alkyl, in particular $C_3$ to $C_{10}$ alkyl, or the group —(CH$_2$—CH$_2$—O)$_x$—H, where x is an integer from 1 to 25, preferably 2 to 20, and in particular 3 to 15

The hydroxybenzotriazol derivative is preferably selected from the group comprised of 1-hydroxybenzotriazol-4-sulfonic acid, 1-hydroxybenzotriazol-5-sulfonic acid, 1-hydroxybenzotriazol-6-sulfonic acid, 1-hydroxybenzotriazol-7-sulfonic acid, 1-hydroxybenzotriazol-4-carboxylic acid, 1-hydroxybenzotriazol-5-carboxylic acid, 1-hydroxybenzotriazol-6-carboxylic acid, 1-hydroxybenzotriazol-7-carboxylic acid, 1-hydroxybenzotriazol-6-N-phenylcarboxamide, 5-ethoxy-6-nitro-1-hydroxybenzotriazol, 4-ethyl-7-methyl-6-nitro-1-hydroxybenzotriazol, 4,6-bis-(trifluoro-methyl)-1-hydroxybenzotriazol-5-bromo-1-hydroxybenzotriazol, 6-bromo-1-hydroxybenzotriazol, 4-bromo-7-methyl-1-hydroxybenzotriazol, 5-bromo-7-methyl-6-nitro-1-hydroxybenzotriazol, 4-bromo-6-nitro-1-hydroxybenzotriazol, 6-bromo-4-nitro-1-hydroxybenzotriazol, 4-chloro-1-hydroxybenzotriazol, 5-chloro-1-hydroxybenzotriazol, 6-chloro-1-hydroxybenzotriazol, 6-chloro-5-isopropyl-1-hydroxybenzotriazol, 5-chloro-6-methyl-1-hydroxybenzotriazol, 6-chloro-5-methyl-1-hydroxybenzotriazol, 4-chloro-7-methyl-6-nitro-1-hydroxybenzotriazol, 4-chloro-5-methyl-1-hydroxybenzotriazol, 5-chloro-5-methyl-1-hydroxybenzotriazol, 4-chloro-6-nitro-1-hydroxybenzotriazol, 4-chloro-4-nitro-1-hydroxybenzotriazol, 7-chloro-1-hydroxybenzotriazol, 6-diacetylamino-1-hydroxybenzotriazol, 4,6-dibromo-1-hydroxybenzotriazol, 4,6-dichloro-1-hydroxybenzotriazol, 5,6-dichloro-1-hydroxybenzotriazol, 4,5-dichloro-1-hydroxybenzotriazol, 4,7-dichloro-1-hydroxybenzotriazol, 5,7-dichloro-6-nitro-1-hydroxybenzotriazol, 5,6-dimethoxy-1-hydroxybenzotriazol, 4,6-dinitro-1-hydroxybenzotriazol, 5-hydrazine-7-methyl-4-nitro-1-hydroxybenzotriazol, 5,6-dimethyl-1-hydroxybenzotriazol, 4-methyl-1-hydroxybenzotriazol, 5-methyl-1-hydroxybenzotriazol, 6-methyl-1-hydroxybenzotriazol, 5-(1-methylethyl)-1-hydroxybenzotriazol, 4-methyl-6-nitro-1-hydroxybenzotriazol, 6-methyl-4-nitro-1-hydroxybenzotriazol, 5-methoxy-1-hydroxybenzotriazol, 6-methoxy-1-hydroxybenzotriazol, 7-methyl-6-nitro-1-hydroxybenzotriazol, 4-nitro-1-hydroxybenzotriazol, 6-nitro-1-hydroxybenzotriazol, 6-nitro-4-phenyl-1-hydroxybenzotriazol, 5-phenylmethyl-1-hydroxybenzotriazol, 4-trifluoromethyl-1-hydroxybenzotriazol, 5-trifluoromethyl-1-hydroxybenzotriazol, 6-trifluoromethyl-1-hydroxybenzotriazol, 4,5,6,7-tetrachloro-1-hydroxybenzotriazol, 4,5,6,7-tetrafluoro-1-hydroxybenzotriazol, 6-tetrafluoroethyl-1-hydroxybenzotriazol, 4,5,6-trichloro-1-hydroxybenzotriazol, 4,6,7-trichloro-1-hydroxybenzotriazol, 6-sulfamido-1-hydroxybenzotriazol, 6-N,N-diethyl-sulfamido-1-hydroxybenzotriazol, 6-N-methylsulfamido-1-hydroxybenzotriazol, 6-(1H,1,2,4-triazol-1-yl-methyl)-1-hydroxybenzotriazol, 6-(5,6,7,8-tetrahydroimidazo-[1,5-a]-pyridine-5-yl)1-hydroxybenzotriazol, 6-(phenyl-1H-1,2,4-trizaol-1-ylmethyl)-1-hydroxybenzotriazol, 6-[(5-methyl-1H-imidazo-1-yl)-phenylmethyl]-1-hydroxybenzotriazol, 6-[(4-methyl-1H-imidazo-1-yl)-phenylmethyl]-1-hydroxybenzotriazol, 6-[(2-methyl-1H-imidazo-1-yl)-phenylmethyl]-1-hydroxybenzotriazol, 6-(1H-imidazol-1-yl-phenylmethyl)-1-hydroxybenzotriazol, 5-(1H-imidazol-1-yl-phenylmethyl)-1-hydroxybenzotriazol and 6-[1-(1H-imidazo-1-yl)-ethyl]-1-hydroxybenzotriazol monohydrochloride.

According to a further preferred embodiment of the present invention the alloxanoxime and the derivative thereof are selected from the group comprised of violuric acid and isovioluric acid.

The N-hydroxylated triazine is preferably selected from the group comprised of 3-hydroxy-1,2,3-benzotriazine-4 (3H)-one.

According to a preferred embodiment of the present invention the benzene ring of the N-hydroxyphthalimide derivative is substituted with at least one group selected from the group comprised of the halogen group and carboxy group.

The N-hydroxyphthalimide derivative is preferably selected from the group comprised of N-hydroxyphthalimide, 4-amino-N-hydroxyphthalimide, 3-amino-N-hydroxyphthalimide, N-hydroxy-benzene-1,2,4-tricarboxylic imide, N,N'-dihydroxy-pyromellitic diimide and N,N'-dihydroxybenzophenone-3,3',4,4'-tetracarboxylic diimide.

According to a further preferred embodiment of the present invention, the heterocyclic NO containing compound is selected from the group comprised of N-oxopiperidine and derivatives thereof, preferably 2,2,6,6-tetramethyl-piperidine-1-oxyl (TEMPO), 4-hydroxy-2,2,6,6-tetramethyl-piperidine-1-oxyl, 4-oxo-2,2,6,6-tetramethyl-piperidine-1-oxyl, 4-acetamido-2,2,6,6-tetramethyl-piperidine-1-oxyl, 4-(ethoxyfluorophosphinyloxy)-2,2,6,6-tetramethyl-piperidine-1-oxyl, 4-(isothiocyanato)-2,2,6,6-tetramethyl-piperidine-1-oxyl, 4-maleimido-2,2,6,6-tetramethyl-piperidine-1-oxyl, 4-(4-nitrobenzoyloxy)-2,2,6,6-tetramethyl-piperidine-1-oxyl, 4-(phosphonooxy)-2,2,6,6-tetramethyl-piperidine-1-oxyl, 4-cyano-2,2,6,6-tetramethyl-piperidine-1-oxyl, 3-carbamoyl-2,2,5,5-tetramethyl-3-pyrroline-1-oxyl, 4-phenyl-2,2,5,5-tetramethyl-3-imidazoline-3-oxide-1-oxyl, 4-carbamoyl-2,2,5,5-tetramethyl-3-imidazoline-3-oxide-1-oxyl, 4-phenacylidene-2,2,5,5-tetramethyl-imidazolidine-1-oxyl, 3-(aminomethyl)-2,2,5,5-tetramethyl-pyrrolidine-N-oxyl, 3-carbamoyl-2,2,5,5-tetramethyl-pyrrolidine-N-oxyl, 3-carboxy-2,2,5,5-tetramethyl-pyrrolidine-N-oxyl, 3-cyano-2,2,5,5-tetramethyl-pyrrolidine-N-oxyl, 3 maleimido-2,2,5,5-tetramethyl-pyrrolidine-N-oxyl or 3-(4-nitrophenoxycarbonyl)-2,2,5,5-tetramethyl-pyrrolidine-N-oxyl.

According to a further preferred embodiment of the present invention the phenolic compound is selected from the group comprised of methoxy substituted phenols, in particular mono- or di-methoxy substituted phenols, hydroxybenzoic acids and derivatives thereof, in particular mono-, di- or trihydroxybenzoic acids, with at least one amino group substituted hydroxybenzoic acids and derivatives thereof, polyphenols and derivatives thereof, in particular flavanols or flavanoids, and diphenols and derivatives thereof, in particular 4,4'-methylene diphenol.

The methoxy substituted phenol is preferably selected from the group comprised of 4-hydroxy-3,5-dimethoxybenzaldehydrazine, 2,6-dimethoxyphenol, 4-hydroxy-3,5-dimethoxybenzaldehyde, 4-hydroxy-3-methoxybenzaldehyde, 4-hydroxy-3-methoxy benzoic acid, 3,5-dimethoxy-4-hydroxy-acetophenone, 3,5-dimethoxy-4-hydroxybenzoic-ethylester, trans-3,5-dimethoxy-4-hydroxycinnamic acid, 4-hydroxy-3-methoxycinnamic acid, dimethoxybenzyl alcohol, in particular 3,4-dimethoxybenzyl alcohol, 4-hydroxy-3-methoxyphenyl acetic acid, 3-hydroxy-4-methoxybenzoic acid and substituted derivatives thereof.

The hydroxybenzoic acid is preferably selected from the group comprised of 3,4-dihydroxycinnamic acid, 3,5-dihydroxybenzoic acid, 2,4-dihydroxybenzoic acid, 2,6-dihydroxybenzoic acid, 2,3-dihydroxybenzoic acid, 3,4-dihydroxybenzoic acid, 4-hydroxybenzoic acid, 3-hydroxybenzoic acid, 2,4,6-trihydroxybenzoic acid, p-hydroxyphenyl acetic acid, 2-hydroxybenzoic acid and 4-hydroxycinnamic acid.

The hydroxybenzoic acid substituted with at least one amino group is preferably selected from the group comprised of 3-hydroxyanthranilic acid, 4-amino-3-hydroxybenzoic acid and 4-aminosalicylic acid.

According to a preferred embodiment of the present invention the polyphenol is selected from the group comprised of catechin, epicatechin, quercetin and naringin.

The nitroso compound is preferably a substituted or unsubstituted naphthalene sulfonic acid, preferably selected from the group comprised of 1-nitroso-2-naphthol-3,6-disulfonic acid and 4-hydroxy-3-nitroso-1-naphthalene sulfonic acid.

The phenothiazine which is substituted or unsubstituted is preferably selected from the group comprised of chlorpromazine, promazine, phenothiazine, 10-phenothiazine proprionic acid, promethiazine and 10-methylphenothiazine.

The phenyl compound is preferably selected from the group comprised of dimethoxybenzyl alcohol, in particular 2,3-dimethoxybenzyl alcohol, 2,4-dimethoxybenzyl alcohol, 2,5-dimethoxybenzyl alcohol, 3,4-dimethoxybenzyl alcohol or 3,5-dimethoxybenzyl alcohol, dimethylaminobenzoic acid, α-hydroxyphenylacetic acid, benzoic acid and cinnamic acid.

The heterocyclic compound is preferably selected from the group comprised of substituted or unsubstituted 2,2'-azino-di-(3-ethylbenzothiazoline)-6-sulfonic acid (ABTS), 2-(3-(4-amino-9,10-dihydro-3-sulfo-9,10-dioxoanthracene-4-yl)amino benzolsulfonyl)vinyl)-disodiumsulfate and anthraquinone sulfonic acid.

According to a preferred embodiment the composition according to the invention comprises a mass fraction of 1% to 15%, preferably 2% to 10%, of a mediator solution at a concentration of 1 mmol/L to 500 mmol/L, preferably 2 mmol/L to 100 mmol/L, especially preferred 3 mmol/L to 30 mmol/L, and a mass fraction of 1% to 10%, preferably of 2% to 5%, of an enzyme solution with an enzymatic activity of 1 U/mL to 500 U/mL, preferably of 5 U/mL to 200 U/mL, especially preferably of 10 to 100 U/mL. The unit U is here defined as is customary in biochemistry as that enzyme quantity that catalyzes the conversion of 1 μmol of the substrate in the time of 1 minute. If the enzyme solution comprises oxygenases exclusively, the addition of mediators is not necessary.

In a further preferred embodiment to the enzyme, utilized as a drying agent for the oxidatively drying binder and the optionally preferably provided mediator, additionally salts or complex compounds of iron are added. In the course of the investigations in connection with the invention on which this patent application is based, it was found that by adding iron salts or iron complexes the activity of the drying agent, formed by the enzyme and optionally a mediator, can be markedly increased, wherein the substance quantity of iron can be markedly lower than the substance quantity, conventionally employed in known siccatives, of the above described transition metals, in each instance referred to the same quantity of the resin to be cured oxidatively.

A further aspect of the present invention relates to the use of a composition according to the invention as a binder in coating agents, in particular as a paint coat, clear coat or glaze and stain finishes on substrates which are preferably selected from wood, wood materials such as fiber board, and metals.

The present invention will be described in greater detail in conjunction with the following examples without, however, being restricted to them.

EXAMPLES

The drying time was determined using a BK 3 speed Drying Recorder by TQC GmbH at 23° C. and a relative humidity of 50%. After applying the films onto glass strips (wet layer thickness 75 μm), a vertical dull needle with loading of 5 g was positioned in the freshly applied film and subsequently drawn in the parallel direction to the coating length through the drying paint. Three phases were differentiated herein: Phase a) the paint runs together ("levelling"; flattening out), Phase b) a line is visible, the paint begins to set (to polymerize—base trace), Phase c) the film can no longer be pressed away (surface drying time). The maximal time period for this test was 48 hours.

The tack-free time was determined by applying the coatings at a wet layer thickness of 75 μm at 23° C. and a relative humidity of 50%. The coating is considered tack free when fingerprints can no longer be observed after touching the surface with a clean and dry finger. The tack-free time is measured using a timing device.

According to DIN EN ISO 3682 the acid number is defined as the quotient of the mass m(KOH) of potassium hydroxide that is required to neutralize a sample to be examined, and the mass m(sample) of this sample (mass of the substance to be examined in the sample in solutions or dispersions); its conventional unit is "mg/g". According to DIN EN ISO 4629 the hydroxyl number is defined as the quotient of that mass m(KOH) of potassium hydroxide which has the same number of hydroxyl groups as a sample to be tested, and the mass m(sample) of this sample (mass of the substance to be investigated in the sample in solutions or dispersions); its conventional unit is "mg/g".

In specifications of contents of certain substances B in mixtures or solutions, such as solid matter content, conventionally measured in % or cg/g, always indicate mass fractions w(B) calculated as the quotient of the mass m(B) of the particular substance and the mass m(total) of the mixture or solution.

Example 1

Alkyd Resin

An alkyd resin was prepared as follows:
Adding 1.03 g triethylamine as a catalyst, 629 g soy oil fatty acid, 245 g phthalic acid anhydride and 160 g pentaerythrite were heated to 150° C. in a synthetic resin reactor while stirring. The reaction mass was stirred at this temperature until the acid number had fallen to 5 mg/g (three hours). The reaction mass was subsequently cooled. The resin had a hydroxyl number of 80 mg/g, the yield was 1000 g.

Example 2

Synthesis of an Emulsifier Resin and Emulsion

An adduct was initially prepared from 868 g methoxypolyethyleneglycol of mean molar mass 1000 g/mol and 132 g tetrahydrophthalic acid anhydride while adding a mass fraction of 0.1% triethylamine as a catalyst. This mixture was heated to 150° C. while being stirred and kept at these reaction conditions until an acid number of lower than 50 mg/g had been reached. 558 g of the adduct obtained were subsequently mixed with 402 g of the alkyd resin from Example 1. Added to this were 96 g xylene and the resulting mixture was heated to 230° C. while being stirred. After azeotropic distillation at 230° C. with xylene as the entrainer to remove the water formed in the reaction and subsequent distillation under reduced pressure to remove the entrainer, a solvent-free product with an acid number of 1 mg/g and a dynamic viscosity (diluted with water to a mass fraction of the reaction product in the solution of 50%, measured according to DIN EN ISO 3219 at 23° C.) of 5 Pa·s was obtained. After storage at 40° C. for 2 weeks the viscosity of the solution was virtually unchanged.

Example 3

Preparation of Aqueous Emulsified Alkyd Resin

An alkyd resin emulsion was prepared from the alkyd resin of Example 1 and the emulsifier of Example 2. For this purpose 120 g of the product of Example 2 were placed into a conventional synthetic resin reactor equipped with anchor agitator. The product was heated to 80° C. and 880 g of the alkyd resin from Example 1 preheated to 80° C. were added over a period of two hours under continuous stirring. After continued homogenation for one hour, heating was discontinued and by slowly adding water at a temperature of approximately 22° C. the mixture was diluted to the desired solid mass fraction of 60% and cooled further to 30° C. The dynamic viscosity of the emulsion (measured as above) was 80 mPa·s.

Example 4

Clear Coats and Drying Rate

TABLE 1

Compositions of the coatings:

|  | A | A1 | A2 | A3 |
|---|---|---|---|---|
| Alkyd resin emulsion from Example 3, mass in g [2] | 23 | 23 | 23 | 23 |
| "Cobalt 12" emulsion, mass in g [3] |  | 0.025 |  |  |
| Th laccase solution, volume in mL [4] |  |  | 1.25 | 1.25 |
| HBT solution, volume in mL [5] |  |  |  | 2.00 |

[2] Alkyd resin emulsion according to Example 3
[3] Water based cobalt octoate emulsion, mass fraction of cobalt metal: 12%
[4] (51.11 ± 2.15) U/mL activity of the enzyme: 51.11 ± 2.15 U/mL; U = unit, where 1 U is defined as stated above in the text (determination of enzyme activity by oxidation of ABTS in 50 mmol/L succinate buffer at a pH of 4.5 and 27° C.)
[5] 1-hydroxybenzotriazol dissolved at a concentration of 20 mmol/L in water The alkyd resin compositions according to Table 1 were mixed for 24 hours in a laboratory mixing device before the application of the coatings onto the glass plates. The following results were obtained for the drying rates (Table 1a):

TABLE 1a

Results of drying

|  | Tack-free time (hrs) | Length of Phase a) (hrs) | Length of Phase b) (hrs) | Length of Phase c) (hrs) |
|---|---|---|---|---|
| A | 120 | 25 | 39 | Not dry after 2 days |
| A1 | 6 | 5 | 10 | 12 |
| A2 | 48 | 18 | 39 | 43 |
| A3 | 100 | 21 | 48 | Not dry after 2 days |

Identical results with respect to the drying rate were obtained with the emulsification of the alkyd resin from Example 1 with conventional low-molecular emulsifiers, specifically with alkylphenol ethoxylates and fatty alcohol ethoxylates, such as described in U.S. Pat. Nos. 3,269,967 and 3,440,193, with unsaturated polyurethanes as emulsifiers, such as described in DE-A 43 06 946, and with emulsifier resins based on a polyhydroxyl component from the class of polyalcohols which are capable of ring closure through dehydration, an alkoxypolyethylene glycol and from mono- and dicarboxylic acids or their anhydrides, such as described in EP-A 1 092 742.

It was found that when using the enzyme alone no substantial effect is observed, only the addition of the mediator to the enzyme catalyzed system leads to a significant acceleration of the drying and higher mediator additions exert an advantageous effect.

Example 5a

Preparation of ABTS/Emulsifier Resin Mixture 50 g of the emulsifier resin from Example 2 (100% solid content, not diluted with water) were mixed with 2.5 g ABTS and while stirring under continuous nitrogen flow heated to 80° C. until a clear solution of the components was formed.

Example 5b

Preparation of HBT/Emulsifier Mixture 50 g of the emulsifier resin from Example 2 (100% solid content, not diluted with water) were mixed with 2.5 g HBT and while stirring under continuous nitrogen flow heated to 80° C. until a clear solution of the components was formed.

Example 5c

Preparation of Vanillin/Emulsifier Resin Mixture 50 g of the emulsifier resin from Example 2 (100% solid content, not diluted with water) were mixed with 2.5 g vanillin and while stirring and under continuous nitrogen flow the mixture was heated to 80° C. until a clear solution of the components was formed.

Example 5d

Preparation of 4-Hydroxybenzoic Acid/Emulsifier Resin Mixture 50 g of the emulsifier resin from Example 2 (100% solid content, not diluted with water) were mixed with 2.5 g 4-hydroxybenzoic acid and while stirring under continuous nitrogen flow the mixture was heated to 80° C. until a clear solution of the components was formed.

Example 6

Preparation of a Cobalt Emulsion 75 g of emulsifier resin from Example 2 (50% solid content in water) were placed into a dissolver beaker and stirred at $3000^{min-1}$ with an agitator equipped with a serrated disk. Under continuous agitation 25 g of the solution of a cobalt borate neododecanoate complex (CAS number 68457-13-6) dissolved in aromatics-free benzine (cobalt metal content 18%) were dosed to the emulsifier resin with a violet emulsion resulting. Additional 50 g water were added to the mixture, the final cobalt content of the emulsion was w(Co)=3%.

Example 7

Preparation of Clear Coats and Test of Drying Time

Clear coats having the composition according to the Table were prepared (using the method of Example 4) 24 hours before the application onto glass strips.

Example 8

FT-IR Study of Reaction Kinetics

The clear coats 2, 4, 6 and 7 according to Example 7 and a blank test (pure alkyd resin emulsion according to Example 3) were examined by means of FT-IR spectroscopy. The clear coats are applied onto ZnSe substrates in a dry layer thickness of 20 μm and measured after 10 min in transmission using a standard FT-IR spectrometer. The measurement was repeated after 6 days. During the intermediate time the samples were stored in a desiccator.

The FT-IR spectra in the following images show absorption bands at 3009 cm$^{-1}$ (C=C double bond) and 3450 cm$^{-1}$ (OH, hydroperoxides, water). During the crosslinking of the alkyd resin the C=C double bonds of the unsaturated fatty acids vanish and water and hydroperoxides are formed, with the broad bands at 3450 cm$^{-1}$ gaining in intensity. The investigation (FIGS. 1 to 4) show uniquely that the double bond bands of the clear coats 2 and 7 vanish completely, whereas the double bond bands in clear coat 6 (contains only iron complex) after the same length of drying time is still clearly visible. In the spectra of the pure alkyd resin emulsion (without addition of driers) no decrease of the double bond bands can be observed. The addition of iron has an

TABLE 2

Composition of the clear coats

| | Clear coat | | | | | | |
|---|---|---|---|---|---|---|---|
| | 1 | 2 | 3 | 4 | 5 | 6 | 7 |
| Alkyd emulsion according to Example 3, mass in g | 50 | 50 | 50 | 50 | 50 | 5o | 50 |
| Th laccase solution [1], volume in mL | 5.44 | 5.44 | 5.44 | 5.44 | 5.44 | | |
| ABTS mixture [2], mass in g | 0.58 | 0.58 | | | | | |
| HBT mixture [2], mass in g | 0.58 | 0.58 | | | | | |
| Vanillin mixture [2], mass in g | | | | 0.58 | 0.58 | | |
| 4-HBA mixture [2], mass in g | | | | 0.58 | 0.58 | | |
| Borchi ®OXY - Coat [3], mass in g | | 0.001 | | 0.001 | 0.001 | 0.001 | |
| Cobalt emulsion [4], mass in g | | | | | | | 0.2 |

[1] Activity of the enzyme: 51.11 ± 2.15 U/mL (U = unit, with 1 U defined as stated above in the text (determination of enzyme activity by oxidation of ABTS in 50 mmol/L succinate buffer at pH 4.5 and 27° C.).
[2] Mediator/emulsifier resin mixture according to Examples 5a to 5d.
[3] Iron complex dissolved in propane-1,2-diol (iron metal content w(Fe) = 0.09%), OMG Borchers GmbH
[4] Cobalt emulsion according to Example 6.

The following results were obtained for the drying time and tack-free time:

TABLE 2a

Figure 6:
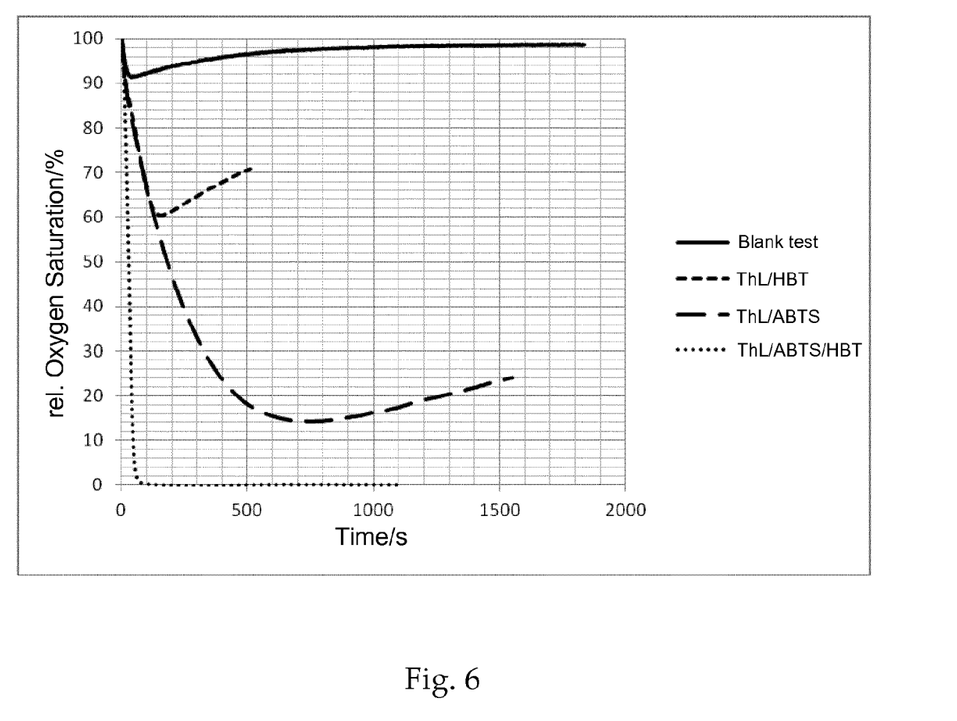
FIG. 6 shows the relative oxygen consumption using ThL in combination with ABTS/HBT, ThL in combination with ABTS, ThL in combination with HBT, and a blank, based on the study described in Examples 9a and 9b.

| | Clear coat | | | | | | |
|---|---|---|---|---|---|---|---|
| | 1 | 2 | 3 | 4 | 5 | 6 | 7 |
| Length of Phase a) in hours | 36 | 1.5 | >48 | 3 | 11 | >48 | 1.5 |
| Length of Phase b) in hours | >48 | 4.5 | — | 15 | 26 | — | 5 |
| Length of Phase c) in hours | — | 39 | — | 39 | >48 | — | 31 |
| Tack-free time in hours | >100 | 51 | >100 | 72 | 98 | >100 | 32 | especially advantageous effect with minor quantities (less than one hundredth of the mass of cobalt) being already sufficient. As can be seen in the spectrum of the clear coat 6 the use of iron alone is not sufficient, however, notable is the synergistic effect in combination with enzyme and mediator.

Example 9a

Measurement of Oxygen Consumption Using *Myceliophthora thermophila* Laccase (MtL)

Oxygen consumption was measured with an "optical oxygen meter" Firesting O2 (Pyro Science, Germany). For this purpose the sensors were placed into 4 mL glass vials. The oxygen consumption was measured through the glass wall by means of a 1 mm PMMA fiber optic waveguide. To this end 1800 μL mediator solution (0.1 mmol/L in a potassium phosphate buffer at a concentration of 100 mmol/L, pH 7) were placed into the glass vial equipped with an agitator and 10 μL *Myceliophthora thermophila* laccase (MtL) (5 U/mL) were added to it (U=unit, see above). In the case of the mediator combination ABTS/HBT, 0.05 mmol/L ABTS and HBT each were provided and the same procedure as before was followed. As the blank test 1800 μL potassium phosphate buffer at a pH of 7 were placed into a glass vial. After the saturation concentration of oxygen in the medium had stabilized, 100 μL of alkyd resin emulsion (according to Example 3) were added.

The active TI center of the *Myceliophthora thermophila* laccase (MtL) had a potential of 470 mV. (Ref: Spectroscopic Studies and Electronic Structure Description of the High Potential Type 1 Copper Site in Fungal Laccase: Insight into the Effect of the Axial Ligand, Journal of the American Chemical Society, Palmer, Amy E.; Randall, David W.; Xu, Feng; Solomon, Edward I.)

Example 9b

Measurement of Oxygen Consumption Using *Trametes hirsuta* Laccase (ThL)

Figure 1:
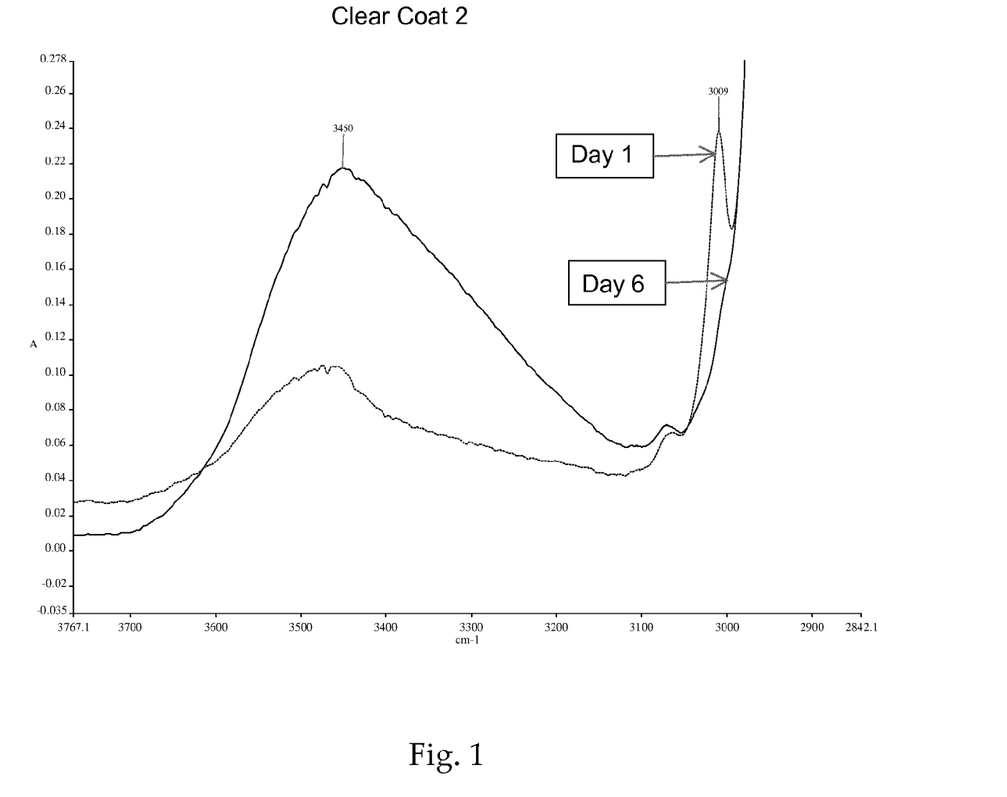
FIG. 1 shows FT-IR spectra for Clear Coat 2, as prepared in accordance with Example 7, and in accordance with the study described in Example 8.
Figure 2:
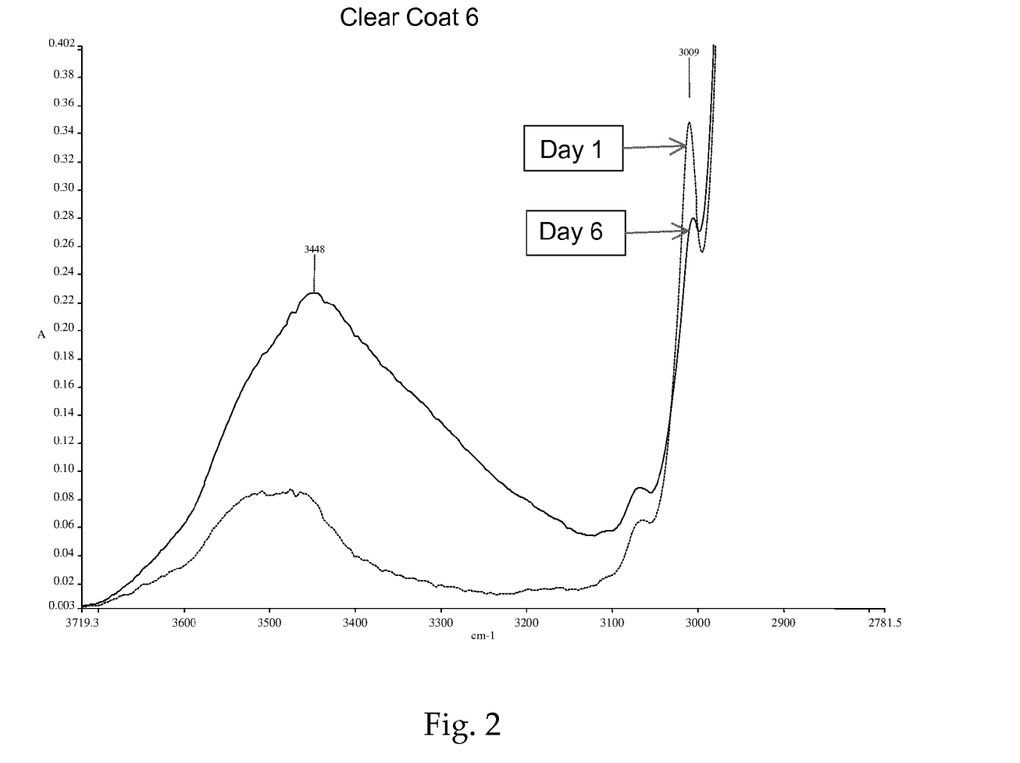
FIG. 2 shows FT-IR spectra for Clear Coat 6, as prepared in accordance with Example 7, and in accordance with the study described in Example 8.
Figure 3:
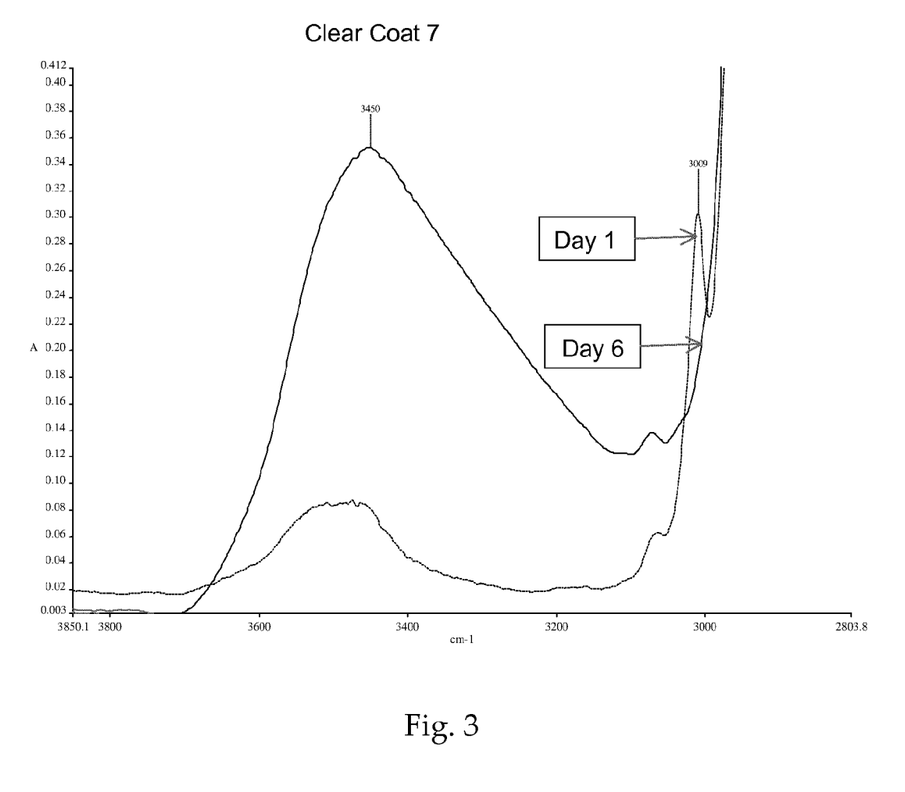
FIG. 3 shows FT-IR spectra for Clear Coat 7, as prepared in accordance with Example 7, and in accordance with the study described in Example 8.
Figure 4:
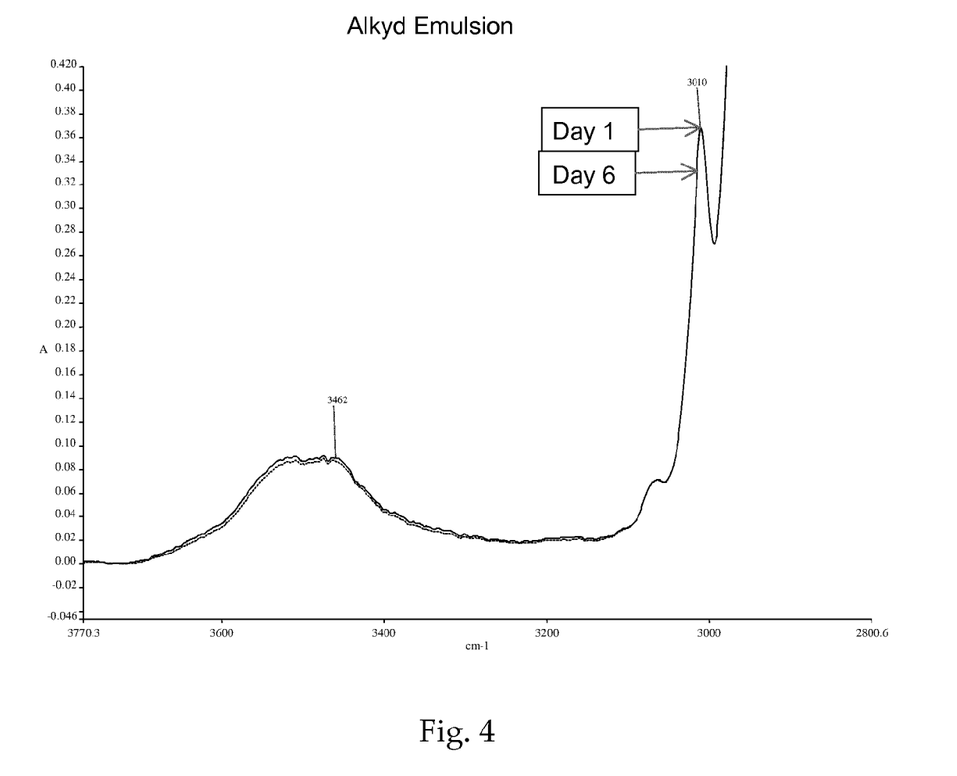
FIG. 4 shows FT-IR spectra for an alkyd resin emulsion, as prepared in accordance with Example 3, and in accordance with the study described in Example 8.
Figure 5:
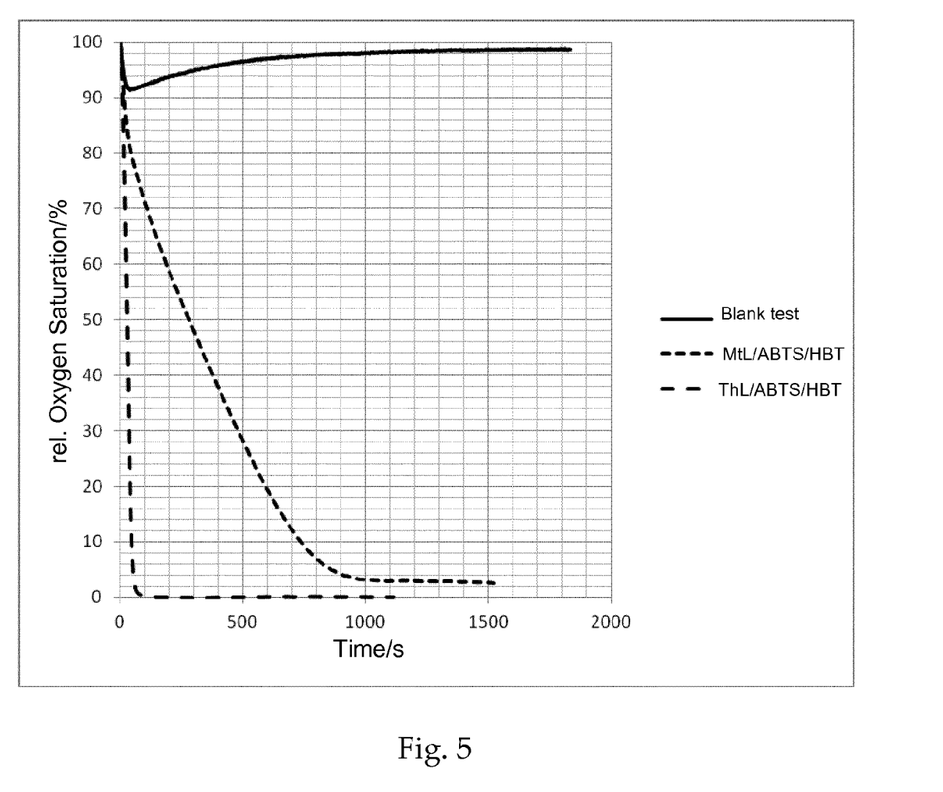
FIG. 5 shows the relative oxygen consumption using *Myceliophthora thermophila* laccase (MtL) in combination with 2,2'-azino-di-(3-ethylbenzothiazoline)-6-sulfonic acid (ABTS)/1-hydroxybenzotriazol (HBT), *Trametes hirsuta* laccase (ThL) in combination with ABTS/HBT, and a blank, based on the study described in Examples 9a and 9b.

Oxygen consumption was measured with an "optical oxygen meter" Firesting O2 (Pyro Science, Germany). For this purpose the sensors were placed into 4 mL glass vials. The oxygen consumption was measured by means of a 1 mm PMMA fiber optic waveguide through the glass wall. To this end 1800 μL mediator solution (0.1 mmol/L in an ammonium acetate buffer at a concentration of 50 mmol/L, pH 4.5) were placed into the glass vial equipped with an agitator and 10 μL *Trametes hirsuta* laccase (ThL) (5 U/mL) were added (U=unit, see above). In the case of the mediator combination ABTS/HBT 0.05 mmol/L ABTS and HBT each were provided and the same procedure as described before was followed. As the blank test 1800 μL ammonium acetate buffer at a pH of 4.5 were placed into a glass vial. After the saturation concentration of oxygen in the medium had stabilized, 100 μL of alkyd resin emulsion (according to Example 3) were added. The active TI center of the *Trametes hirsuta* laccase (ThL) had a potential of 780 mV. (Ref.: Comparison of physico-chemical characteristics of four laccases from different basidiomycetes; Biochimie; S.V. Shleev et al.). The consumption of oxygen by the laccase was used for the comparison of effectiveness of the different mediators and their combinations for the oxidation of the alkyd resin emulsion. The measured decrease of the oxygen saturation after the addition of the alkyd resin emulsion to the solution of the oxidized mediator can be correlated with the progression of the oxidation of the alkyd resin. Significant differences between the different mediators and their combinations and the two different laccases could be observed (FIGS. 5 and 6): Laccase from *Trametes hirsuta* is markedly more active than that from *Myceliophthora thermophila*; ABTS in combination with both laccases acts better than HBT, however the combination of both mediators is unexpectedly even more advantageous than had been anticipated based on the individual experiments.

The invention claimed is:

1. A method for curing a coating agent for surfaces by applying an oxidatively drying coating composition onto the surfaces and exposing the said oxidatively drying coating composition to the action of an oxidizing agent wherein the said coating composition comprises at least one oxidatively drying binder which is an alkyd resin, and at least one drying agent acting as an accelerator of the drying and curing process proceeding under the action of the said oxidizing agent, wherein the said drying agent comprises at least one oxidoreductase enzyme, a salt of iron or a complex compound of iron, and at least one mediator, wherein the mediator is oxidized by the said oxidizing agent with cooperation of the said at least one oxidoreductase enzyme, and then in a subsequent reaction, the mediator oxidizes the said oxidatively drying binder, the mediator thereby being converted to its reduced form.

2. The method as claimed in claim 1, wherein the at least one oxidatively drying binder is an alkyd resin emulsifiable in water.

3. The method as claimed in claim 1, wherein the alkyd resin is selected from the group consisting of
   a) alkyd resins that are produced from fatty acids, polyvalent alcohols and polybasic organic acids,
   b) alkyd resins that are produced from oils, polyvalent alcohols and polybasic organic acids,
   c) urethane alkyds that are obtained by conversion of hydroxy functional alkyd resins a) or b) with polyfunctional isocyanates,
   d) alkyd resins that are obtained by grafting an alkyd resin a) or b), or the fatty acids utilized in their production, with olefinically unsaturated monomers,
   e) alkyd resins that are obtained by conversion of an alkyd resin a) or b) with hydroxy functional silicon oligomers or polymers, wherein the alkyd resin before the conversion is provided with an isocyanate functionality or an acid anhydride functionality,
   f) alkyd resins that are obtained by transesterification or transamidation of an alkyd resin a) or b) with polyamidoamines at increased temperatures starting at 180° C.,
   g) epoxide alkyd resins that are obtained by conversion of a mixture of fatty acid-modified epoxide resins and mono- and di-glycerides with di- or polycarboxylic acids,
   h) phenolic resin-modified alkyd resins, and
   i) maleinate alkyd resins comprising an adduct of an alkyd resin and an olefinically unsaturated acid component selected from the group consisting of maleic acid anhydride and resin acids, wherein fatty acids or oils utilized for the synthesis of the said maleinate alkyd resins comprise a mass fraction of at least monounsaturated fatty acids of at least 3%.

4. The method as claimed in claim 3, wherein the resin acids are abietinic acid, palustrinic acid, pimaric acid and/or isopimaric acid or mixtures thereof.

5. The method as claimed in claim 1, wherein the at least one oxidoreductase enzyme is an oxidase enzyme, an oxygenase enzyme or a peroxidase enzyme.

6. The method as claimed in claim 5, wherein the oxidase enzyme is selected from the group consisting of polyphenol oxidase enzyme, laccase enzyme, catechol oxidase enzyme, tyrosinase and bilirubin oxidase enzyme.

7. The method as claimed in claim 6, wherein the laccase enzyme is of fungal or bacterial origin.

8. The method as claimed in claim 7, wherein the laccase enzyme is derived from a fungus selected from the group consisting of *P. radiata, C. hirsitus, P. pinsitus, P. versicolor, S. thermophilium, P. oryzae, C. cinereus, T. hirsuta, T. villosa,* and *T. versicolor.*

9. The method as claimed in claim 7, wherein the laccase enzyme is derived from a fungus selected from the group consisting of *Collybia, Fomus, Lentinus, Pleurotus, Aspergillus, Neurospora, Podospora, Phlebia, Coriolus, Botrytis, Polyporus, Rhizoctonia solani, Scytalidium, Pyricularia, Coprinus, Trametes, Coriolopsis gallica, Phanerochaete chrysosporium, Heterobasidion annosum, Spiniger meineckellus* and *Myceliophthora thermophila.*

10. The method as claimed in claim 7, wherein the laccase enzyme is derived from a bacterium selected from the group consisting of *Bacillus, Pseudomonas, Streptomyces* and *Azospirillum.*

11. The method as claimed in claim 5, wherein the oxygenase enzyme is selected from the group consisting of monophenol monooxygenase enzyme.

12. The method as claimed in claim 5, wherein the peroxidase enzyme is of plant, bacterial or fungal origin.

13. The method as claimed in claim 12, wherein the peroxidase enzyme of fungal origin is isolated from a fungus selected from the group consisting of the genus *Coprinus.*

14. The method as claimed in claim 12, wherein the peroxidase enzyme of microbial origin is isolated from a *bacillus.*

15. The method as claimed in claim 12, wherein the peroxidase of plant origin is selected from the group consisting of horseradish peroxidase enzyme, soy bean peroxidase enzyme, pea peroxidase enzyme, guar bean peroxidase enzyme, garbanzo bean peroxidase enzyme, scarlet runner bean peroxidase enzyme, rice peroxidase enzyme, cotton leaf peroxidase enzyme and haloperoxidase enzyme.

16. The method as claimed in claim 13, wherein the peroxidase enzyme of fungal origin is isolated from a fungus selected from the group consisting of *Coprinus cinerius* and *Coprinus macrorhizus.*

17. The method as claimed in claim 14, wherein the peroxidase enzyme of microbial origin is isolated from *Bacillus pumilus.*

18. The method as claimed in claim 1, wherein the at least one mediator is selected from the group consisting of cycloaliphatic NO or NOH containing compounds, heterocyclic compounds optionally containing NO or NOH, aromatic NO or NOH containing compounds, phenolic compounds, nitroso compounds, phenothiazine, phenyl compounds, polyoxometalates, 2,4-pentanedione and derivatives of these compounds.

19. The method as claimed in claim 18, wherein the heterocyclic NOH containing compound is selected from the group consisting of hydroxybenzotriazol and its derivatives, alloxanoxime and its derivatives, N-hydroxy-N-phenylacetamide and its derivatives, N-hydroxylated triazine and its derivatives, and N-hydroxyphthalimide and its derivatives.

20. The method as claimed in claim 19, wherein the hydroxybenzotriazol derivative has the formula wherein M represents hydrogen, alkali metal, alkaline earth metal, ammonium, $C_1$ to $C_4$ alkylammonium or $C_1$ to $C_4$ alkanolammonium, and the groups $R^1$, $R^2$, $R^3$ and $R^4$ are identical or different and represent hydrogen, halogen, hydroxyl, formyl, amino, nitro, a straight-chain or branched $C_1$ to $C_{12}$ alkyl, a straight-chain or branched $C_1$ to $C_6$ alkoxy, carbonyl-$C_1$-to $C_6$-alkyl, phenyl, benzyl, phenyloxy, —$COOR^5$, —$SO_2OR^5$, —$SO_2NH_2$, —$NHSO_2$, —$CONH_2$, —$PO(OR^5)_2$, —$P(OR^5)_2$ or —$OPO(OR^5)_2$, wherein $R^5$ is identical or different and represents hydrogen, alkali metal, alkaline earth metal, ammonium, $C_1$ to $C_4$ alkylammonium or $C_1$ to $C_4$ alkanolammonium, a straight-chain or branched $C_1$ to $C_{18}$ alkyl, or the group —$(CH_2—CH_2—O)_x$—H, where x is an integer from 1 to 25.

21. The method as claimed in claim 20, wherein the hydroxybenzotriazol derivative is selected from the group consisting of 1-hydroxybenzotriazol-4-sulfonic acid, 1-hydroxybenzotriazol-5-sulfonic acid, 1-hydroxybenzotriazol-6-sulfonic acid, 1-hydroxybenzotriazol-7-sulfonic acid, 1-hydroxybenzotriazol-4-carboxylic acid, 1-hydroxybenzotriazol-5-carboxylic acid, 1-hydroxybenzotriazol-6-carboxylic acid, 1-hydroxybenzotriazol-7-carboxylic acid, 1-hydroxybenzotriazol-6-N-phenylcarboxamide, 5-ethoxy-6-nitro-1-hydroxybenzotriazol, 4-ethyl -7-methyl-6-nitro-1-hydroxybenzotriazol, 4,6-bis-(trifluoro-methyl)-1-hydroxybenzotriazol, 5-bromo-1-hydroxybenzotriazol, 6-bromo-1-hydroxybenzotriazol, 4-bromo-7-methyl-1 -hydroxybenzotriazol, 5-bromo-7-methyl-6-nitro-1-hydroxybenzotriazol, 4-bromo-6-nitro-1-hydroxybenzotriazol, 6-bromo-4-nitro-1-hydroxybenzotriazol, 4-chloro-1-hydroxybenzotriazol, 5-chloro-1-hydroxybenzotriazol, 6-chloro-1-hydroxybenzotriazol, 6-chloro-5-isopropyl-1-hydroxybenzotriazol, 5-chloro-6-methyl-1-hydroxybenzotriazol, 6-chloro-5-methyl-1-hydroxybenzotriazol, 4-chloro-7-methyl-6-nitro-1-hydroxybenzotriazol, 4-chloro-5-methyl-1-hydroxybenzotriazol, 5-chloro-5-methyl-1-hydroxybenzotriazol, 4-chloro-6-nitro-1-hydroxybenzotriazol, 4-chloro-4-nitro-1-hydroxybenzotriazol, 7-chloro-1-hydroxybenzotriazol, 6-diacetylamino-1-hydroxybenzotriazol, 4,6-dibromo-1-hydroxybenzotriazol, 4,6-dichloro-1-hydroxybenzotriazol, 5,6-dichloro-1-hydroxybenzotriazol, 4,5-dichloro-1-hydroxybenzotriazol, 4,7-dichloro-1-hydroxybenzotriazol, 5,7-dichloro-6-nitro-1-hydroxybenzotriazol, 5,6-dimethoxy-1-hydroxybenzotriazol, 4,6-dinitro-1-hydroxybenzotriazol, 5-hydrazine-7-methyl-4-nitro-1-hydroxybenzotriazol, 5,6-dimethyl-1-hydroxybenzotriazol, 4-methyl-1-hydroxybenzotriazol, 5-methyl-1-hydroxybenzotriazol, 6-methyl-1-hydroxybenzotriazol, 5-(1-methylethyl)-1-hydroxybenzotriazol, 4-methyl-6-nitro-1-hydroxybenzotriazol, 6-methyl-4-nitro-1-hydroxybenzotriazol, 5-methoxy-1-hydroxybenzotriazol, 6-methoxy-1-hydroxybenzotriazol, 7-methyl-6-nitro-1-hydroxybenzotriazol, 4-nitro-1-hydroxybenzotriazol, 6-nitro-1-hydroxybenzotriazol, 6-nitro-4-phenyl-1-hydroxybenzotriazol, 5-phenylmethyl-1-hydroxybenzotriazol, 4-trifluoromethyl-1-hydroxybenzotriazol, 5-trifluoromethyl-1-hydroxybenzotriazol, 6-trifluoromethyl-1-hydroxybenzotriazol, 4,5,6,7-tetrachloro-1-hydroxybenzotriazol, 4,5,6,7-tetrafluoro-1-hydroxybenzotriazol, 6-tetrafluoroethyl -1-hydroxybenzotriazol, 4,5,6-trichloro-1-hydroxybenzotriazol, 4,6,7-trichloro-1-hydroxybenzotriazol, 6-sulfamido-1-hydroxybenzotriazol, 6-N,N-diethyl-sulfamido-1-hydroxybenzotriazol, 6-N-methylsulfamido-1-hydroxybenzotriazol, 6-(1H, 1,2,4-triazol-1-yl -methyl)-1-hydroxybenzotriazol, 6-(5,6,7,8-tetrahydroimidazo-[1,5-a]pyridine-5-yl)1-hydroxybenzotriazol, 6-(phenyl-1H-1,2,4-trizaol-1-ylmethyl)-1-hydroxybenzotriazol, 6-[(5-methyl-1H-imidazo-1-yl)-phenylmethyl]-1-hydroxybenzotriazol, 6-[(4-methyl-1H-imidazo-1-yl)-phenylmethyl]-1-hydroxybenzotriazol, 6-[(2-methyl-1H-imidazo-1-yl)-phenylmethyl]-1-hydroxybenzotriazol, 6-(1H-imidazol-1-yl-phenylmethyl)-1-hydroxybenzo-triazol, 5-(1H-imidazol-1-yl-phenylmethyl)-1-hydroxybenzotriazol and 6-[1-(1H-imidazo-1-yl)-ethyl]-1-hydroxybenzotriazol monohydrochloride.

22. The method as claimed in claim 20, wherein the hydroxybenzotriazol derivative has the formula wherein M represents hydrogen, alkali metal selected from the group consisting of sodium and potassium, alkaline earth metal selected from the group consisting of calcium or magnesium, ammonium, $C_1$ to $C_4$ alkylammonium or $C_1$ to $C_4$ alkanolammonium, and the groups $R^1$, $R^2$, $R^3$ and $R^4$ are identical or different and represent hydrogen, halogen selected from the group consisting of fluorine, chlorine and bromine, hydroxyl, formyl, amino, nitro, a straight-chain or branched $C_1$ to $C_{12}$ alkyl, a straight-chain or branched $C_1$ to $C_6$ alkoxy, carbonyl-$C_1$-to $C_6$-alkyl, phenyl, benzyl, phenyloxy, —COOR$^5$, —SO$_2$OR$^5$, —SO$_2$NH$_2$, —NHSO$_2$, —CONH$_2$, —PO(OR$^5$)$_2$, —P(OR$^5$)$_2$ or —OPO(OR$^5$)$_2$, wherein $R^5$ is identical or different and represents hydrogen, alkali metal selected from the group consisting of sodium and potassium, alkaline earth metal selected from the group consisting of calcium or magnesium, ammonium, $C_1$ to $C_4$ alkylammonium or $C_1$ to $C_4$ alkanolammonium, a straight-chain or branched $C_2$ to $C_{15}$ alkyl, or the group —(CH$_2$—CH$_2$—O)$_x$—H, where x is an integer from 2 to 20.

23. The method as claimed in claim 20, wherein the hydroxybenzotriazol derivative has the formula wherein M represents hydrogen, alkali metal selected from the group consisting of sodium and potassium, alkaline earth metal selected from the group consisting of calcium or magnesium, ammonium, $C_1$ to $C_4$ alkylammonium or $C_1$ to $C_4$ alkanolammonium, and the groups $R^1$, $R^2$, $R^3$ and $R^4$ are identical or different and represent hydrogen, halogen selected from the group consisting of fluorine, chlorine and bromine, hydroxyl, formyl, amino, nitro, a straight-chain or branched $C_1$ to $C_{12}$ alkyl, a straight-chain or branched $C_1$ to $C_6$ alkoxy, carbonyl-$C_1$-to $C_6$-alkyl, phenyl, benzyl, phenyloxy, —COOR$^5$, —SO$_2$OR$^5$, —SO$_2$NH$_2$, —NHSO$_2$, —CONH$_2$, —PO(OR$^5$)$_2$, —P(OR$^5$)$_2$ or —OPO(OR$^5$)$_2$, wherein $R^5$ is identical or different and represents hydrogen, alkali selected from the group consisting of sodium and potassium, alkaline earth metal selected from the group consisting of calcium or magnesium, ammonium, $C_1$ to $C_4$ alkylammonium or $C_1$ to $C_4$ alkanolammonium, a straight-chain or branched $C_3$ to $C_{10}$ alkyl, or the group —(CH$_2$-CH$_2$—O)$_x$—H, where x is an integer from 3 to 15.

24. The method as claimed in claim 19, wherein the alloxanoxime and the derivative thereof are selected from the group consisting of violuric acid and isovioluric acid.

25. The method as claimed in claim 19, wherein the N-hydroxylated triazine is of 3-hydroxy-1,2,3-benzotriazine-4(3H)-one.

26. The method as claimed in claim 19, wherein the benzene ring of the N-hydroxyphthalimide derivative is substituted with at least one group selected from the group consisting of a halogen group and a carboxyl group.

27. The method as claimed in claim 19, wherein the N-hydroxyphthalimide derivative is selected from the group consisting of N-hydroxyphthalimide, 4-amino-N-hydroxyphthalimide, 3-amino-N-hydroxyphthalimide, N-hydroxy-benzol-1,2,4-tricarboxylic acid imide, N,N'-dihydroxypyromellitic acid diimide and N,N'-dihydroxybenzophenone-3,3',4,4'-tetracarboxylic acid diimide.

28. The method as claimed in claim 18, wherein the heterocyclic NO containing compound is selected from the group consisting of N-oxo-piperidine and its derivatives.

29. The method as claimed in claim 28, wherein the N-oxo-piperidine derivative is selected from the group consisting of 2,2,6,6-tetramethyl-piperidine-1-oxyl (TEMPO), 4-hydroxy-2,2,6,6-tetramethyl-piperidine-1-oxyl, 4-oxo-2,2,6,6-tetramethyl-piperidine-1-oxyl, 4-acetamido-2,2,6,6-tetramethyl-piperidine-1-oxyl, 4-(ethoxyfluorophosphinyloxy)-2,2,6,6-tetra-methyl-piperidine-1-oxyl, 4-(isothiocyanato)-2,2,6,6-tetra-methyl-piperidine-1-oxyl, 4-maleimido-2,2,6,6-tetramethyl-piperidine-1-oxyl, 4-(4-nitrobenzoyloxy)-2,2,6,6-tetramethyl-piperidine-1-oxyl, 4-(phosphonooxy)-2,2,6,6-tetramethyl -piperidine-1-oxyl, 4-cyano-2,2,6,6-tetramethyl-piperidine-1-oxyl, 3-carbamoyl-2,2,5,5-tetramethyl-3-pyrroline-1-oxyl, 4-phenyl-2,2,5,5-tetramethyl-3-imidazoline-3-oxide-1-oxyl, 4-carbamoyl-2,2,5,5-tetramethyl-3-imidazoline-3-oxide-1-oxyl, 4-phenacylidene-2,2,5,5-tetramethyl-imidazolidine-1-oxyl, 3-(aminomethyl)-2,2,5,5-tetramethyl-pyrrolidine-N-oxyl, 3-carbamoyl-2,2,5,5-tetramethyl-pyrrolidine-N-oxyl, 3-carboxy-2,2,5,5-tetramethyl-pyrrolidine-N-oxyl, 3-cyano-2,2,5,5-tetramethyl-pyrrolidine-N-oxyl, 3-maleimido-2,2,5,5-tetramethyl-pyrrolidine-N-oxyl and 3-(4-nitrophenoxycarbonyl)-2,2,5,5-tetramethyl-pyrrolidine-N-oxyl.

30. The method as claimed in claim 18, wherein the phenolic compound is selected from the group consisting of methoxy substituted phenols, hydroxybenzoic acids and derivatives thereof, hydroxybenzoic acids and derivatives thereof which are substituted with at least one amino group, polyphenols and derivatives thereof, and diphenols and derivatives thereof.

31. The method as claimed in claim 30, wherein the methoxy substituted phenol is selected from the group consisting of 4-hydroxy-3,5-dimethoxybenzaldehydrazine, 2,6-dimethoxyphenol, 4-hydroxy-3,5-dimethoxybenzaldehyde, 4-hydroxy-3-methoxybenzaldehyde, 4-hydroxy-3-methoxy benzoic acid, 3,5-dimethoxy-4-hydroxy-acetophenone, 3,5-dimethoxy-4-hydroxybenzoicethylester, trans-3, 5-dimethoxy-4-hydroxycinnamic acid, 4-hydroxy-3-methoxycinnamic acid, dimethoxybenzyl alcohol 4-hydroxy-3-methoxyphenyl acetic acid, 3-hydroxy-4-methoxybenzoic acid and substituted derivatives thereof.

32. The method as claimed in claim 30, wherein the hydroxybenzoic acid is selected from the group consisting of 3,4-dihydroxycinnamic acid, 3,5-dihydroxybenzoic acid, 2,4-dihydroxybenzoic acid, 2,6-dihydroxybenzoic acid, 2,3-dihydroxybenzoic acid, 3,4-dihydroxybenzoic acid, 4-hydroxybenzoic acid, 3-hydroxybenzoic acid, 2,4,6-trihydroxybenzoic acid, p-hydroxyphenyl acetic acid, 2-hydroxybenzoic acid and 4-hydroxycinnamic acid.

33. The method as claimed in claim 30, wherein the hydroxybenzoic acid substituted with at least one amino group is selected from the group consisting of 3-hydroxyanthranilic acid, 4-amino-3-hydroxybenzoic acid and 4-aminosalicylic acid.

34. The method as claimed in claim 30, wherein the polyphenol is selected from the group consisting of catechin, epicatechin, quercetin and naringin.

35. The method as claimed in claim 30, wherein the methoxy substituted phenols are selected from the group consisting of mono- and di-methoxy substituted phenols, the hydroxybenzoic acids and derivatives thereof are selected from the group consisting of mono-, di- and trihydroxybenzoic acids and hydroxybenzoic acids and derivatives thereof which are substituted with at least one amino group, the polyphenols and derivatives thereof are selected from the group consisting of flavanols and flavonoids, and the diphenol is 4,4'-methylene diphenol.

36. The method as claimed in claim 31, wherein the dimethoxybenzyl alcohol is 3,4-dimethoxybenzyl alcohol.

37. The method as claimed in claim 18, wherein the nitroso compound is a substituted or unsubstituted naphthalene sulfonic acid.

38. The method as claimed in claim 37, wherein the nitroso compound is a substituted or unsubstituted naphthalene sulfonic acid selected from the group consisting of 1-nitroso-2-naphthol-3,6-disulfonic acid and 4-hydroxy-3-nitroso-1naphthalene sulfonic acid.

39. The method as claimed in claim 18, wherein the phenothiazine is substituted or unsubstituted.

40. The method as claimed in claim 39, wherein the phenothiazine is substituted or unsubstituted and is selected from the group consisting of chlorpromazine, promazine, phenothiazine, 10-phenothiazine propionic acid, promethiazine and 10-methylphenothiazine.

41. The method as claimed in claim 18, wherein the phenyl compound is selected from the group consisting of dimethoxybenzyl alcohol, dimethylaminobenzoic acid, α-hydroxyphenylacetic acid, benzoic acid and cinnamic acid.

42. The method as claimed in claim 41, wherein the dimethoxybenzyl alcohol is selected from the group consisting of 2,3-dimethoxybenzyl alcohol, 2,4-dimethoxybenzyl alcohol, 2,5-dimethoxybenzyl alcohol, 3,4-dimethoxybenzyl alcohol, 3,5-dimethoxybenzyl alcohol, and dimethylaminobenzoic acid.

43. The method as claimed in claim 18, wherein the heterocyclic compounds optionally containing NO or NOH are selected from the group consisting of substituted or unsubstituted 2,2'-azino-di-(3-ethylbenzothiazoline)-6-sulfonic acid (ABTS), 2-(3-((4-amino-9, 10-dihydro-3-sulfo-9, 10-dioxoanthracene-4-yl)aminobenzenesulfonyl)vinyl)-disodiumsulfate and anthraquinone sulfonic acid.

44. The method as claimed in claim 1, wherein the oxidizing agent is air.

* * * * *